(12) United States Patent
Wu et al.

(10) Patent No.: US 10,235,541 B2
(45) Date of Patent: Mar. 19, 2019

(54) SYSTEM AND METHOD FOR CONFIDENTIAL DATA MANAGEMENT

(71) Applicants: Inventec (Pudong) Technology Corporation, Shanghai (CN); INVENTEC CORPORATION, Taipei (TW)

(72) Inventors: Cheng-Yu Wu, Taipei (TW); Ming-Yuan Liu, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 225 days.

(21) Appl. No.: 15/475,118

(22) Filed: Mar. 30, 2017

(65) Prior Publication Data
US 2018/0144155 A1    May 24, 2018

(30) Foreign Application Priority Data

Nov. 22, 2016 (CN) .......................... 2016 1 1041047

(51) Int. Cl.
G06F 21/00 (2013.01)
G06F 21/79 (2013.01)
G06F 21/62 (2013.01)

(52) U.S. Cl.
CPC .......... G06F 21/79 (2013.01); G06F 21/6209 (2013.01); *G06F 2221/2143* (2013.01)

(58) Field of Classification Search
None
See application file for complete search history.

(56) References Cited

U.S. PATENT DOCUMENTS

| | | | | |
|---|---|---|---|---|
| 7,187,771 B1* | 3/2007 | Dickinson | ............... | G06F 21/31 380/228 |
| 2004/0068631 A1* | 4/2004 | Ukeda | ..................... | G06F 21/10 711/163 |
| 2005/0005131 A1* | 1/2005 | Yoshida | .................. | G06F 21/31 713/183 |
| 2010/0005013 A1* | 1/2010 | Uriarte | ................... | G06Q 20/04 705/30 |
| 2010/0313037 A1* | 12/2010 | Ward | ..................... | G06Q 10/08 713/189 |
| 2012/0018511 A1* | 1/2012 | Hammad | ............... | G06Q 20/12 235/380 |
| 2012/0084259 A1* | 4/2012 | Welingkar | .............. | G06F 21/88 707/647 |
| 2014/0129834 A1* | 5/2014 | Brill | ....................... | H04L 9/321 713/168 |

(Continued)

*Primary Examiner* — Ponnoreay Pich
(74) *Attorney, Agent, or Firm* — CKC & Partners Co., LLC

(57) ABSTRACT

The present invention discloses a system and method for confidential data management, which is adapted for managing confidential data saved at a private space of a USB disk. The private space is needed to have a specific password to decrypt. The method comprises the following steps: determining that character strings inputting by a user matches the specific password or not; if matches, decrypting the private space; capturing an IP address of a computer device connected to the USB disk; transmitting the IP address to a remote management server; analyzing the IP address by the remote management server so as to locate a current position of the USB disk.

10 Claims, 2 Drawing Sheets

(56) References Cited

U.S. PATENT DOCUMENTS

| | | | |
|---|---|---|---|
| 2015/0172916 A1* | 6/2015 | Parker, II | H04W 12/02 455/411 |
| 2015/0199684 A1* | 7/2015 | Maus | G06Q 20/3829 705/71 |
| 2015/0242603 A1* | 8/2015 | Cross | G06F 21/45 726/7 |
| 2015/0379286 A1* | 12/2015 | Nordback | G06F 21/6209 713/165 |
| 2016/0112872 A1* | 4/2016 | McClement | H04W 12/06 455/411 |
| 2017/0317824 A1* | 11/2017 | Brown | H04L 9/0894 |

* cited by examiner

SYSTEM AND METHOD FOR CONFIDENTIAL DATA MANAGEMENT

RELATED APPLICATIONS

This application claims priority to Chinese Application Serial Number 201611041047.8, filed Nov. 22, 2016, which is herein incorporated by reference.

BACKGROUND

Field of Invention

The present invention relates to a system and method for confidential data management.

Description of Related Art

Generally speaking, using Universal Serial Bus (USB) to backup data is a normal solution. However, if using USB disk to backup company confidential data, the confidential data may be stolen when the USB disk is lost. For now, there is no effective way to respond that.

SUMMARY

The present invention provides a system and method for confidential data management. A specific password is needed to read the data of a private area of the USB disk if the USB disk is encrypted. If the password is wrong, the USB disk is formatted, so as to the data of the private area is deleted. Therefore, a finder cannot read the data of the private area of the USB disk easily even the original holder loses the USB disk. In addition, when the finder tries to read the USB disk, the system of the present invention returns the Internet Protocol (IP) address of the computer device which reads the USB disk to a remote management server. The remote management server analyzes the IP address so as to locate the current position of the USB disk. Accordingly, the original holder can know the current position of the USB disk.

An aspect of the disclosure is to provide a confidential data management method, adapted for managing at least one confidential data stored in a USB disk, wherein the USB disk is divided into a public area and a private area, the private area is read by decrypting a specific password, the confidential data management method comprises the following steps: determining if character strings inputting by a user match the specific password or not; if the character strings inputting by the user match the specific password, the private area is decrypted and can be read; capturing an IP address, wherein the IP address is belonged to a computer device physically connected to the USB disk; transmitting the IP address to a remote management server; and analyzing the IP address so as to locate a current position of the USB disk.

In one embodiment of the present invention, the confidential data management method further comprises the following steps: providing a default authorization mechanism for an original holder of the USB disk, the default authorization mechanism comprises a phone number authorization, an email address authorization, a login account name authorization, and a login password authorization; and providing the original holder to login the remote management server through the default authorization mechanism.

In one embodiment of the present invention, the confidential data management method further comprises the following steps: providing a plurality of authorized IP addresses, the plurality of authorized IP addresses are set by the original holder logging in the remote management server through the default authorization mechanism; determining if the IP address captured from the computer device is one of the plurality of authorized IP addresses or not; and transmitting an alarm message to the remote management server if the IP address captured from the computer device is not one of the plurality of authorized IP addresses.

In one embodiment of the present invention, the confidential data management method further comprises the following steps: formatting the private area if a frequency of character strings inputting by the user not matching the specific password is greater than a default frequency, and the default frequency is set by the original holder when the original holder logins the remote management server.

In one embodiment of the present invention, the confidential data management method further comprises the following steps: backing up the confidential data of the private area to the remote management server if the computer device is connected to the remote management server through the network; and formatting the private area if a frequency of character strings inputting by the user not matching the specific password is greater than a default frequency after the confidential data of the private area has been already stored in the remote management server, and the default frequency is set by the original holder when the original holder logins the remote management server.

An aspect of the disclosure is to provide a confidential data management system, and the confidential data management system comprises a remote management server, a USB disk, and a computer device. The computer device comprises a processing unit and a transceiver unit. The USB disk is divided into a public area and a private area, the private area stores at least one confidential data, the private area is read by decrypting a specific password. The computer device is connected to the USB disk physically. The computer device connected to the remote management server through a network. The processing unit determines that if character strings inputting by a user match the specific password or not. The private area is decrypted and can be read if the character strings inputting by a user match the specific password. The processing unit captures an IP address. The processing unit transmits the IP address to the remote management server through the transceiver unit. The remote management server analyzes the IP address so as to locate a current position of the USB disk.

In one embodiment of the present invention, the remote management server provides a default authorization mechanism for an original holder of the USB disk, the default authorization mechanism comprises a phone number authorization, an email address authorization, a login account name authorization, and a login password authorization, the default authorization mechanism provides the original holder to login the remote management server.

In one embodiment of the present invention, the remote management server provides a plurality of authorized IP addresses, the plurality of authorized IP addresses are set by the original holder logging in the remote management server through the default authorization mechanism, the processing unit determines if the IP address captured from the computer device is one of the plurality of authorized IP addresses or not, if the IP address captured from the computer device is not one of the plurality of authorized IP addresses, the processing unit transmits an alarm message to the remote management server through the transceiver unit.

In one embodiment of the present invention, the processing unit formats the private area if a frequency of character strings inputting by the user not matching the specific password is greater than a default frequency, and the default frequency is set by the original holder when the original holder logins the remote management server.

In one embodiment of the present invention, the processing unit backups the confidential data of the private area to the remote management server if the computer device is connected to the remote management server through the network, after the confidential data of the private area has been already stored in the remote management server, the processing unit formats the private area if a frequency of character strings inputting by the user not matching the specific password is greater than a default frequency, and the default frequency is set by the original holder when the original holder logins the remote management server.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
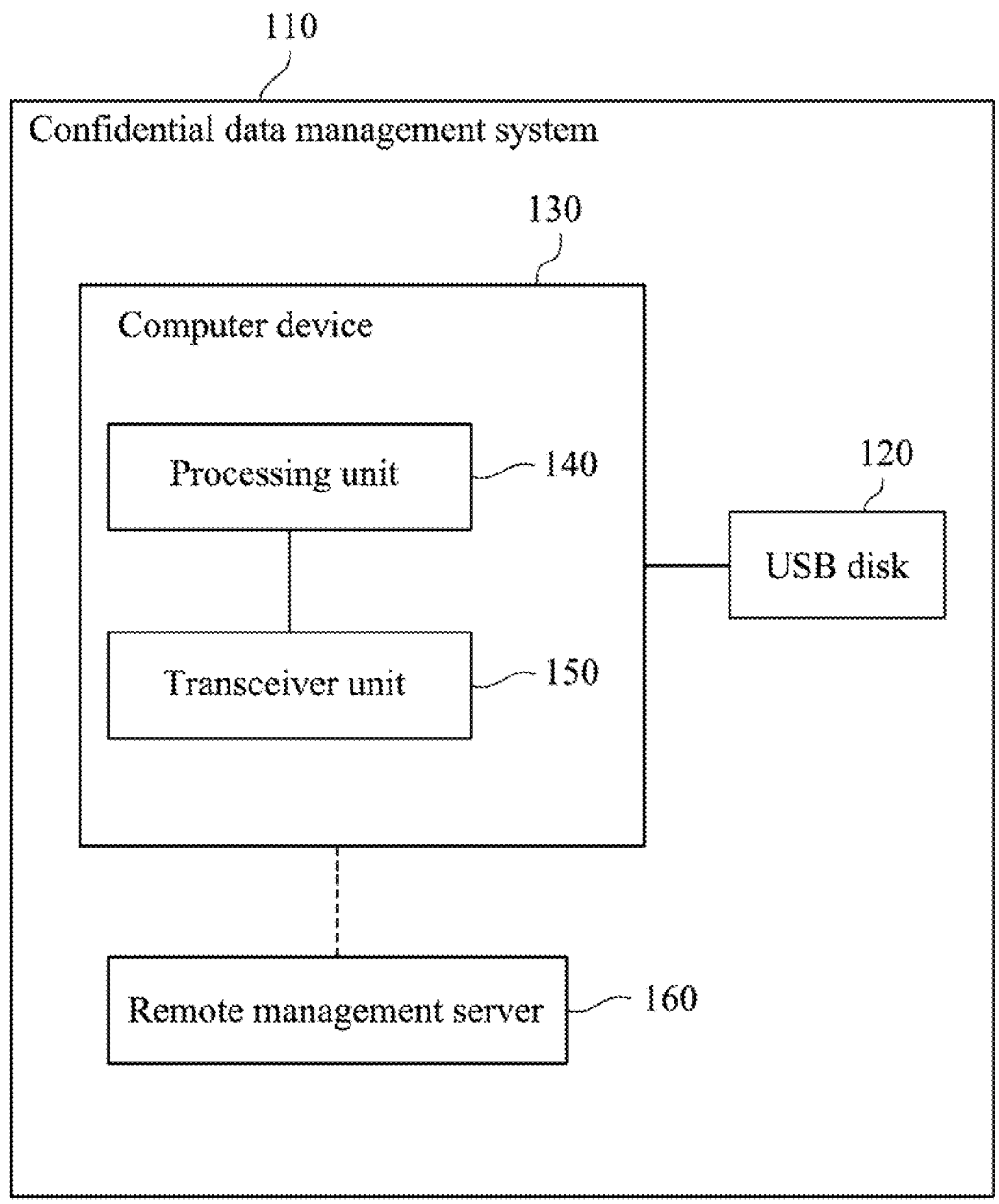
FIG. 1 is a block diagram of the confidential data management system according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention discloses a system and method for confidential data management, which is adapted for managing the confidential data stored in a USB disk. FIG. 1 is a block diagram of the confidential data management system according to the first embodiment of the present invention. The confidential data management system 110 comprises a USB disk 120, a computer device 130, and a remote management server 160. The computer device 130 is connected to the USB disk 120 physically. The computer 130 is connected to the remote management server 160 through the network. The computer device 130 comprises a processing unit 140 and a transceiver unit 150. The processing unit 140 can be a central processor. The transceiver unit 150 can be an internet interface card.

The USB disk 120 is divided into a public area and a private area. The private area stores at least one confidential data. The private area is read by decrypting a specific password. When the USB disk 120 is inserted to the computer device 130, the public area is displayed at the disk list. However, the private area is displayed at the disk list only by inputting the specific password.

Figure 2:
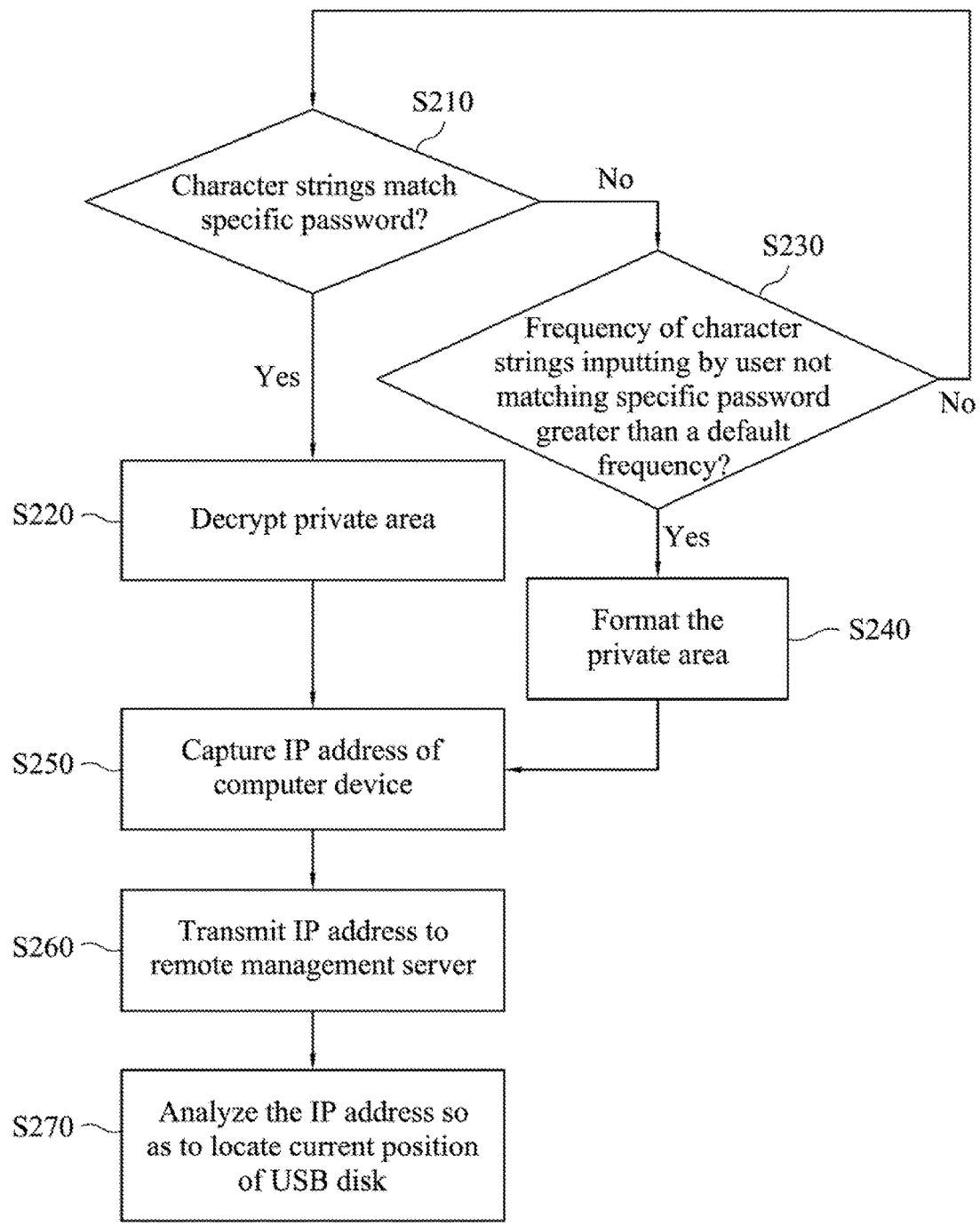
FIG. 2 is a flowchart of the confidential data management method according to the first embodiment of the present invention.

FIG. 2 is a flowchart of the confidential data management method according to the first embodiment of the present invention. Firstly, the processing unit 140 determines that if character strings inputting by a user match the specific password or not (Step S210). The private area is decrypted and can be read if the character strings inputting by the user match the specific password (Step S220).

If the determination of Step S210 is no, the character strings inputting by the user do not match the specific password, then the processing unit 140 determines if a frequency of character strings inputting by the user not matching the specific password is greater than a default frequency or not (Step S230). If the determination of S230 is yes, the processing unit 140 formats the private area (Step S240). If the determination of S230 is no, return to Step S210. The processing unit 140 determines that if the character strings inputting by the user match the specific password or not. The default frequency is set by the original holder when the original holder logins the remote management server 160.

After Step S220 or Step S240, the processing unit 140 captures a IP address of the computer device 130 (Step 250). The processing unit 140 transmits the IP address to the remote management server 160 through the transceiver unit 130 (Step 260). Next, the remote management server 160 analyzes the IP address so as to locate a current position of the USB disk 120 (Step S270).

As described above, the private area of USB disk 120 is encrypted. If the USB disk 120 is lost, the finder cannot read the confidential data of the private area of the USB disk 120. In addition, if the frequency of the finder inputting the wrong password is greater than the default frequency, the private are is formatted automatically and the confidential data will be deleted. For example, the finder inputs the wrong password three times, and the default frequency is two, then, the private are is formatted automatically. However, in other embodiment of the present invention, the original holder can also login the remote management server 160 to change the setting. For example, if the finder inputs the wrong password one time, the private area is formatted.

In addition, when the finder uses the computer device 130 to read the USB disk 120 and the computer device has been already connected to the network, the confidential data management system 110 transmits the IP address of the computer device 130 to the remote management server 160. Accordingly, the remote management server 160 analyzes the current position of the USB disk 120 according to the IP address. Therefore, the original holder can obtain the current position of the USB disk 120.

In other embodiment of the present invention, the remote management server 160 provides a default authorization mechanism for the original holder of the USB disk 120. The default authorization mechanism comprises a phone number authorization, an email address authorization, a login account name authorization, and a login password authorization. For example, the remote management server 160 can check that the login user is the original holder or not through the phone number, email address or other personal profiles inputting by the login user. Through the default authorization mechanism, the original holder can login the remote management server 160 to modify the default frequency of inputting the wrong password and other related settings if the USB disk 120 is lost. The original holder can login the remote management server 160 through the default authorization mechanism to modify the specific password which decrypts the USB disk 120.

In other embodiment of the present invention, the remote management server 160 provides a plurality of authorized IP addresses. The pluralities of authorized IP addresses are set by the original holder logging in the remote management server through the default authorization mechanism. The processing unit 140 determines if the IP address captured from the computer device 130 is one of the plurality of authorized IP addresses or not. If the IP address captured from the computer device is not one of the pluralities of authorized IP addresses, the processing unit 140 transmits an alarm message to the remote management server 160 through the transceiver unit 150.

Accordingly, if the USB disk 120 is lost and the original holder logins the remote management server 160, the original holder can know that there is at least one finder trying to read the confidential data of the USB disk 120 through the alarm message.

In other embodiment of the present invention, the processing unit 140 backups the confidential data of the private area to the remote management server 160 if the computer device 130 is connected to the remote management server through the network. After the confidential data of the private area has been already stored in the remote management server 160, the processing unit 140 formats the private area if a frequency of character strings inputting by the user not matching the specific password is greater than a default frequency. The default frequency is set by the original holder when the original holder logins the remote management server 160.

The present invention provides a system and method for confidential data management. A specific password is needed to read the data of a private area of the USB disk if the USB disk is encrypted. If the password is wrong, the USB disk is formatted, so as to the data of the private area is deleted. Therefore, a finder cannot read the data of the private area of the USB disk easily even the original holder loses the USB disk. In addition, when the finder tries to read the USB disk, the system of the present invention returns the IP address of the computer device which reads the USB disk to a remote management server. The remote management server analyzes the IP address so as to locate the current position of the USB disk. Accordingly, the original holder can know the current position of the USB disk.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A confidential data management method, adapted for managing at least one confidential data stored in a USB disk, wherein the USB disk is divided into a public area and a private area, the private area is read by decrypting a specific password, the confidential data management method comprises the following steps:
   determining if character strings inputting by a user match the specific password or not;
   if the character strings inputting by the user match the specific password, the private area is decrypted and can be read;
   capturing an IP address, wherein the IP address is belonged to a computer device physically connected to the USB disk;
   transmitting the IP address to a remote management server; and
   analyzing the IP address so as to locate a current position of the USB disk.

2. The confidential data management method of claim 1, further comprising:
   providing a default authorization mechanism for an original holder of the USB disk, the default authorization mechanism comprises a phone number authorization, an email address authorization, a login account name authorization, and a login password authorization; and
   providing the original holder to login the remote management server through the default authorization mechanism.

3. The confidential data management method of claim 2, further comprising:
   providing a plurality of authorized IP addresses, the plurality of authorized IP addresses are set by the original holder logging in the remote management server through the default authorization mechanism;
   determining if the IP address captured from the computer device is one of the plurality of authorized IP addresses or not; and
   transmitting an alarm message to the remote management server if the IP address captured from the computer device is not one of the plurality of authorized IP addresses.

4. The confidential data management method of claim 2, further comprising:
   formatting the private area if a frequency of character strings inputting by the user not matching the specific password is greater than a default frequency, and the default frequency is set by the original holder when the original holder logins the remote management server.

5. The confidential data management method of claim 2, further comprising:
   backing up the confidential data of the private area to the remote management server if the computer device is connected to the remote management server through the network; and
   formatting the private area if a frequency of character strings inputting by the user not matching the specific password is greater than a default frequency after the confidential data of the private area has been already stored in the remote management server, and the default frequency is set by the original holder when the original holder logins the remote management server.

6. A confidential data management system, comprising:
   a remote management server;
   a USB disk, wherein the USB disk is divided into a public area and a private area, the private area stores at least one confidential data, the private area is read by decrypting a specific password; and
   a computer device, connected to the USB disk physically, wherein the computer device connected to the remote management server through a network, the computer device comprises:
   a transceiver unit; and
   a processing unit, determining that if character strings inputting by a user match the specific password or not, the private area is decrypted and can be read if the character strings inputting by a user match the specific password, the processing unit captures an IP address, the processing unit transmits the IP address to the remote management server through the transceiver unit, the remote management server analyzes the IP address so as to locate a current position of the USB disk.

7. The confidential data management system of claim 6, wherein the remote management server provides a default authorization mechanism for an original holder of the USB disk, the default authorization mechanism comprises a phone number authorization, an email address authorization, a login account name authorization, and a login password authorization, the default authorization mechanism provides the original holder to login the remote management server.

8. The confidential data management system of claim 7, wherein the remote management server provides a plurality of authorized IP addresses, the plurality of authorized IP addresses are set by the original holder logging in the remote management server through the default authorization mechanism, the processing unit determines if the IP address captured from the computer device is one of the plurality of authorized IP addresses or not, if the IP address captured from the computer device is not one of the plurality of authorized IP addresses, the processing unit transmits an alarm message to the remote management server through the transceiver unit.

9. The confidential data management system of claim 7, wherein the processing unit formats the private area if a frequency of character strings inputting by the user not matching the specific password is greater than a default frequency, and the default frequency is set by the original holder when the original holder logins the remote management server.

10. The confidential data management system of claim 7, wherein the processing unit backups the confidential data of the private area to the remote management server if the computer device is connected to the remote management server through the network, after the confidential data of the private area has been already stored in the remote management server, the processing unit formats the private area if a frequency of character strings inputting by the user not matching the specific password is greater than a default frequency, and the default frequency is set by the original holder when the original holder logins the remote management server.

* * * * *